Jan. 21, 1941. H. C. RYKER 2,229,309
STEREOSCOPE
Filed Sept. 1, 1937 2 Sheets-Sheet 2
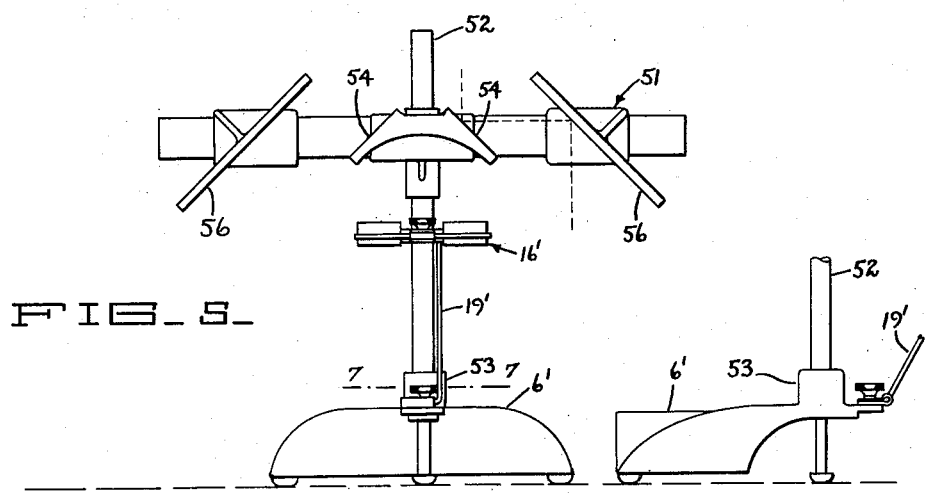
FIG_5_
FIG_8_
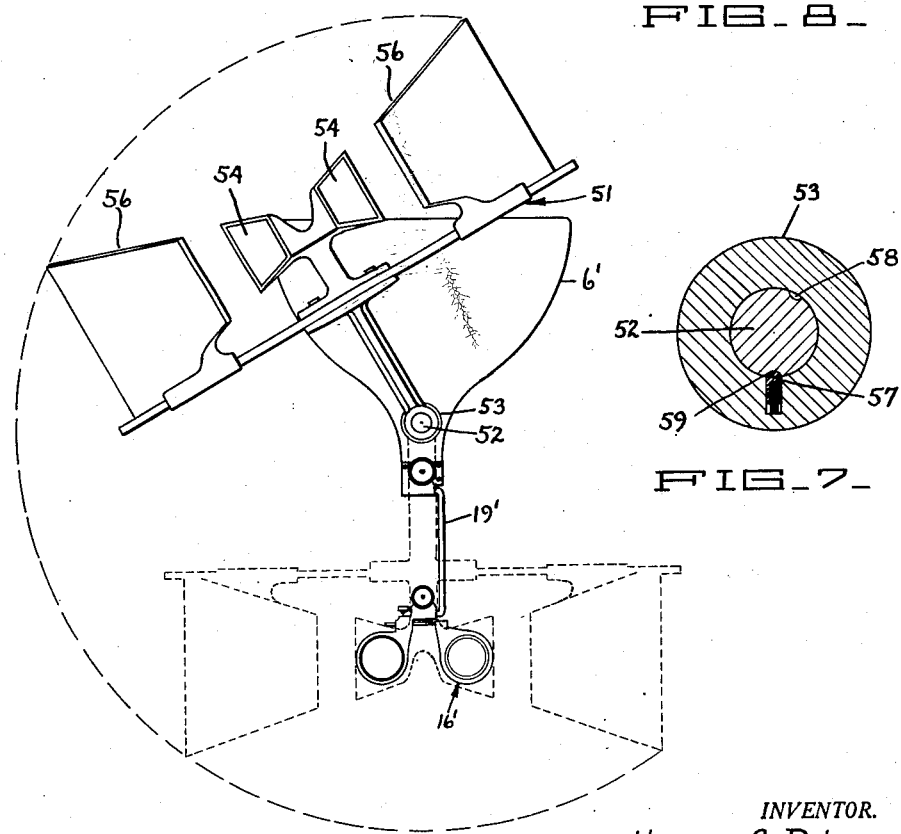
FIG_7_
FIG_6_
INVENTOR.
Harrison C. Ryker
BY
Joseph B. Gardner
ATTORNEYS.

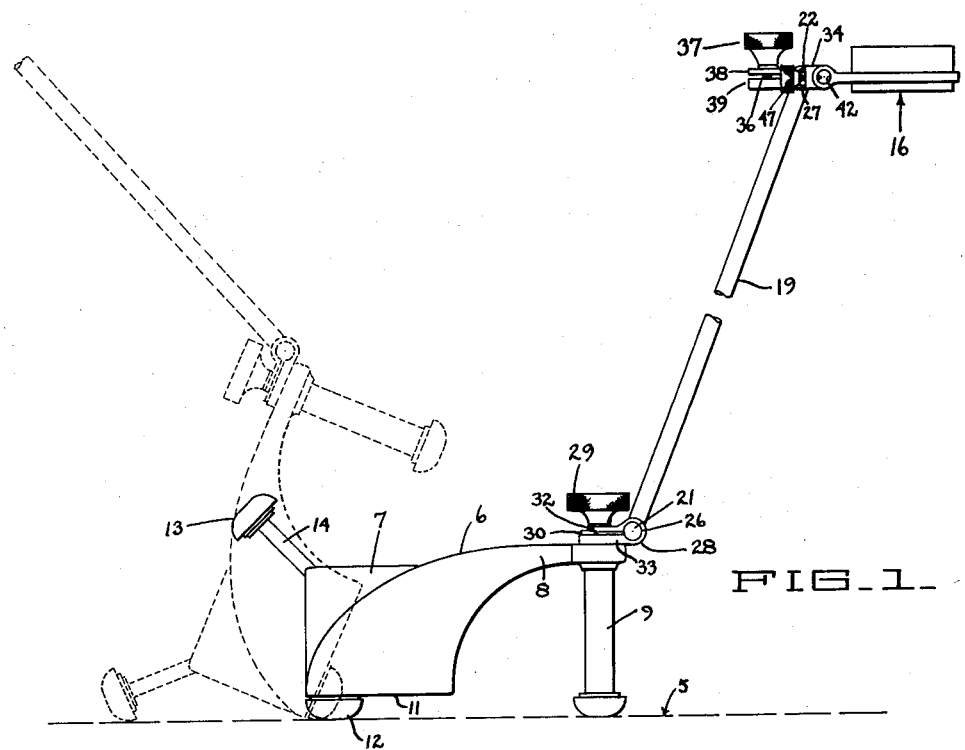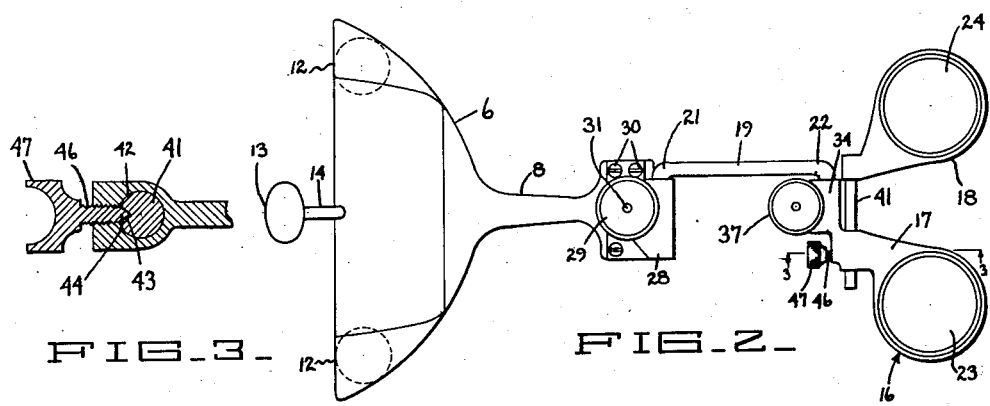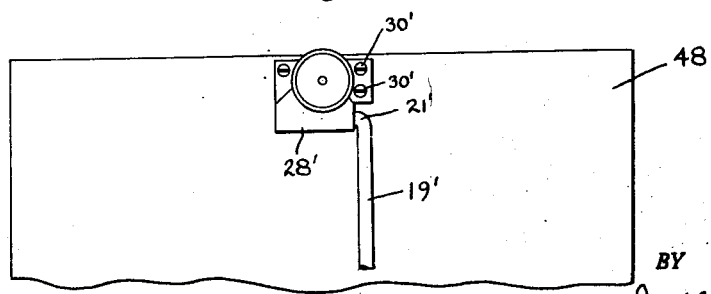

Patented Jan. 21, 1941

2,229,309

UNITED STATES PATENT OFFICE 2,229,309

STEREOSCOPE

Harrison C. Ryker, Oakland, Calif.

Application September 1, 1937, Serial No. 161,973

9 Claims. (Cl. 88—29)

The invention relates to a stereoscope adapted particularly for use with aerial photographs and the like.

Aerial photography has for some time proven popular and economical in mapping relatively large areas which may only be otherwise covered by ground surveys with greater difficulty and considerably more expense. Heretofore the direct vision stereoscope and the mirror stereoscope have been designed as completely independent instruments so that the user has been required to move the pictures from one instrument to the other in using these instruments or else physically displace the instruments into a superimposed position over the pictures. As a result, considerable time and effort is involved in making stereoscopic examination of the photographs by both instruments. In accordance with the present invention and as a principal object thereof I provide a stereoscopic apparatus of the character described which will provide for the unitary and operative mounting of both a mirror stereoscope and a direct vision stereoscope wherein either of these units may be quickly and simply moved into and out of an operable position over the photographs being viewed without interfering with the operation of the other.

Another disadvantage of stereoscopic apparatus of the character described heretofore available has been that the ordinary type of direct vision stereoscope has been unsuited for use in the field because it had no means for holding the pictures flat while being observed. As another object and feature of the present invention my stereoscope is particularly designed for attachment to a drawing board or other flat wood base on which the pictures may be placed and is attached in inoperable position to fold into a compact position on the board so as to permit its ready portability into the field.

A further object of the invention is to provide a direct vision stereoscope having means for varying the separation of the lenses to permit adjustment to individual pupillary separation of different users and to effect such adjustment without interfering with the focus or prismatic axis of the lens.

Still another object of the invention is to provide a stereoscope of the character described which may be quickly and readily adjusted into a plurality of vertically and horizontally spaced positions over the working surface supporting the photographs and which may be moved from such a carefully and closely adjusted position to an inoperable position away from said surface and returned at any time to its former precisely adjusted position without requiring any further individual adjustments of the apparatus.

The invention possesses other objects and features of advantage, some of which, with the foregoing, will be set forth in the following description of the preferred form of the invention which is illustrated in the drawings accompanying and forming part of the specification. It is to be understood, however, that variations in the showing may be adopted within the scope of the invention as set forth in the claims.

Referring to said drawings,

Figure 1 is a side elevation of a stereoscope constructed in accordance with the present invention.

Figure 2 is a plan view of the stereoscope illustrated in Figure 1.

Figure 3 is a fragmentary sectional view of one of the parts of the apparatus and is taken substantially on the plane of line 3—3 of Figure 2.

Figure 4 is a fragmentary plan view of a modified form of the stereoscope support.

Figure 5 is a front elevation of a further modified form of the invention.

Figure 6 is a plan view of the form of the invention illustrated in Figure 5.

Figure 7 is a fragmentary sectional view of the apparatus shown in Figures 5 and 6 and is taken substantially on the plane of line 7—7 of Figure 5.

Figure 8 is a fragmentary side elevation of the base support used in the form of the invention illustrated in Figures 5 to 7.

In the preferred form of the invention as illustrated in Figures 2 to 3 of the accompanying drawings, the stereoscope comprises a portable base support 6 which is adapted for mounting on any generally horizontal supporting surface 7, such as the top working surface of a desk or drafting table or the like. The base 6 is formed with a heavily set rear portion 7 and a forwardly extending neck 8 which is supported forwardly of the portion 7 by means of a vertical foot piece 9. The under side 11 of the solid portion 7 is provided with a pair of transversely spaced feet 12 which, together with the foot 9, provide a three point support for the base on the surface 7 and as a feature of the present construction the base may be rocked rearwardly on the rear feet 12, as shown in dotted lines in Figure 1, so as to raise the forward portion of the support to an elevated and rearwardly retracted position and in such position the base is supported rearwardly of the feet 12 on the outer end 13 of an arm 14, which in the normal position of the base, as first explained, extends upwardly and rearwardly from the base portion 7. This tilting or rearward rocking of the base support is of importance in enabling a ready retraction of the stereoscope from an adjusted position over the working surface 7 to an inoperable retracted position and providing for the return of the stereoscope to precisely its former position without requiring any other adjusting.

The stereoscope of the present apparatus here consists of a binocular eye-piece 16 which is composed of a pair of lens frames 17 and 18 and lenses 20 and is adjustably supported from the base 6 by means of an arm 19 which is pivoted at its opposite ends 21 and 22 to the base and eye-piece respectively. As here shown, the pivotal connection of the arm to the base and eye-piece is such as to afford a rotational displacement of the eye-piece around the base into a plurality of vertically and horizontally spaced positions and in all of such positions the lens frames 17 and 18 are maintained in co-planar alignment so as to maintain an identical focus of lenses 23 and 24 carried in the lens frames. This is effected by pivoting the arm 19 to the base and eye-piece along horizontal axes and as here shown, the opposite ends 21 and 22 of the arm 19 are bent at substantially right angles from the length of the arm and are carried in horizontal cylindrical sockets 26 and 27 provided by the base and the eye-piece. The socket 26 is formed by a clamp 28 secured to the forward extremity of the neck 8 and which is provided with an adjustable locking nut 29 threadably carried on a stud 31 extending through the opposed clamp sides 32 and 33 and secured to the body of the neck 8 for frictionally locking the arm end 21 in the socket 26 in an adjusted position. The socket 27 is formed in a clamp 34 on the lens frame 17, which may be adjusted to frictionally lock the eye-piece in an adjusted rotated position around the arm 22 by means of a stud and hand nut 37 engaged with the opposite sides 38 and 39 of the clamp. It will thus be understood that by rotating the arm about its lower end 21 the eye-piece may be moved in a vertical arc to and from the supporting surface forwardly of the base 6 and that in a proper vertically adjusted position over the work the eye-piece will be so advanced forwardly of the support as to leave the underlying working surface entirely clear and unobstructed for support of the stereoscopic photographs. In the various rotated positions of the arm about this lower end, the eye-piece may be individually adjusted about the upper end 22 of the arm to bring the plane of the lenses to a horizontal or other desired position for viewing the photographs.

As an important feature of the eye-piece I provide for an adjustment of the pupillary spacing of the lenses so as to accommodate the instrument to various individual users. It is common in this type of apparatus to use prismatic lenses so set in the lens frames that the thickest portions and the thinnest portions of the prisms lie along a common transverse axis whereby the optical lines of sight are deviated from the eye-piece to corresponding portions of the stereoscopic photographs and which portions must be transversely aligned in a common plane with the optical centers of the lenses in order to permit proper fusion of the image. For this reason it is essential for effecting a transverse adjustment between the lenses to maintain the transverse lens axes in perfect alignment and at the same time the lenses themselves must be maintained in a common plane so as to maintain identical focus. To afford such a transverse adjustment between the lenses, the lens frame 18 is provided with a transversely extending supporting member 41, preferably in the form of a shaft, and which is slidably carried in a transverse opening 42 in the lens frame 17 so as to permit an adjustment in the transverse spacing of the lenses to conform with the individual pupillary spacing of eyes of various persons. Means for holding the lens frames in co-planar relation along a common transverse axis during such lateral adjustment here consists of a longitudinal slot 43 formed in the rear side of the member 41 and which is engaged by the inner end 44 of a screw 46 carried by the lens frame 17. The engagement of the screw end 44 in the slot 43 maintains the rotated position of the member 44 during lateral adjustment and by rotation of the screw itself to and from the member as by means of a knurled head 47 on the screw, the member 41 may be locked in position or released for movement.

A modified form of the invention is shown illustrated in Figure 4 wherein the stereoscope is supported on a drafting board 48 instead of the base support of the first embodiment. This form of the invention is particularly advantageous for use in the field where no suitable supporting and working surface is available. As illustrated in Figure 4 the lower end 21' of the eye-piece supporting arm 19' is carried in a clamp 28' of the type used in the first embodiment and which is secured directly to the board 48, preferably at a central rear portion of the board, so as to provide a minimum obstruction to the free use of the upper surface of the board for supporting photographs and the like.

A further modified form of the invention has been illustrated in Figures 5 to 8 wherein a mirror type stereoscope 51 is incorporated with the stereoscope unit 16' and the two stereoscope units are supported from a common base 6', the mirror type stereoscope by means of a vertical shaft 52 carried in a socket 53 in the base and the stereoscope 16' by means of an arm 19' as in the first embodiment. In this embodiment of the invention the mirror type stereoscope consists of a pair of opposed downwardly inclining mirrors 54 which form the eye-piece of the instrument and which receive images reflected from laterally positioned mirrors 56 which are in turn set at an angle so as to receive light from stereoscopic pictures from below and to reflect the same to the mirror eye-piece. By means of this instrument relatively widely spaced portions of the photographs may be brought into stereoscopic fusion and due to the relatively wide lateral reflection of the light and the spacing of the mirrors the second stereoscope eye-piece 16' may be mounted directly below the eye-piece of the mirror stereoscope without interfering with the latter's use. When it is desired to use the eye-piece 16' for closer examination of more adjacent portions of the photograph, the mirror stereoscope may be swung around to an inoperable position shown in dotted lines in Figure 6, by turning the vertical shaft 52 in the socket 53. Preferably in order to provide relatively fixed operable and inoperable positions into and from which the mirror stereoscope may be quickly moved, means is provided for automatically holding the mirror stereoscope in its operable and inoperable positions as aforesaid. This means as here shown consists of a spring pressed ball 57 which is carried in the base 6' at the socket 53 and which is engageable in a pair of circumferentially spaced recesses 58 and 59 provided in the shaft for detachably holding the shaft in the two angularly related positions aforesaid.

It will thus be clear that with the apparatus above the direct vision of the stereoscope may be adjusted into an operable position over the working surface and thereafter the mirror stereoscope may be moved into a position over the direct vision eye-piece without requiring the displacement of the latter and the presence of the latter directly under the mirror stereoscope will in no wise interfere with the proper use of the latter instrument. Thus, with both instruments in perfectly adjusted position and superimposed one over the other, neither will interfere with the operation of the other and to use the direct vision eye-piece one has only to swing the mirror stereoscope out of its operative position and when desired the mirror stereoscope may be quickly returned to its operable position and will be self-locking in such position to avoid any requirement of minor adjustments to bring it into proper position over the working surface. It will be understood that while actual mirrors are shown in the mirror type stereoscope such mirrors may be replaced by suitable prisms and that the use of the term "mirror stereoscope" in this specification and the attached claims is in no wise substantially limited to the use of mirrors but rather defines a broad type of stereoscope, wherein the lines of sight are bent from a direct vertical path in order to widen the field of vision.

I claim:

1. A folding stereoscope comprising, a binocular stereoscopic viewing unit including a pair of lens frames, a lug attached to each of said frames, one of said lugs being formed with a passage therethrough parallel to the horizontal transverse optic axis of the viewing unit, a shaft carried by said other lug and slidably mounted in said passage, means holding said shaft against rotation in said passage to maintain the lens frames in a common plane and operable to adjust the transverse spacing of said frames, one of said lugs being formed with a passage therethrough parallel to said first passage, a base support having a horizontal bearing portion with its axis parallel to said last named passage, a supporting rod formed with its opposite ends bent at right angles to the length of the rod, said ends being coplanar and parallel and journaled in said second passage and said bearing portion, and means for adjusting the rotative position of said rod ends in said second passage and said bearing portion.

2. In a device of the character described, a relatively heavy base support adapted for mounting on a working surface or the like, a stereoscopic eye-piece and means adjustably supporting said eye-piece in a plurality of positions relative to said base support and in lateral spaced relation therefrom and in the same vertical plane, said base support having a plurality of feet rearwardly positioned on said base support and located on both sides of the center of gravity of said support and at least one foot located adjacent the forward end of said base support and adapted with said rear feet to normally form the support for said base support and eye-piece, and a supplimental rear supporting means located above said rear feet, said rear supporting means and said rear feet adapted to form the sole support of said eye-piece and base support when said base support has been moved into its inoperative position.

3. A stereoscopic apparatus adapted for viewing stereoscopic aerial photographs and for locating control points and plotting maps therefrom and adapted for use on a drawing table, comprising, a stereoscopic binocular eye-piece, having a pair of viewing axes, a base support adapted for mounting on said drawing table, and means connecting said eye-piece and support for positioning said eye-piece over said table in laterally spaced relation to said support to leave the underlying table free from said support for the receipt of said photographs said last named means including an arm having a plurality of pivots parallel to each other one of said pivots being mounted to rotate adjacent to the forward end of said base support and the other of said pivots being connected to said eye-piece, and means being operable to adjust the vertical and horizontal position of said eye-piece over said table while maintaining the viewing axes of said eye-piece substantially perpendicular to said table and in maintaining the planes of said viewing axes in all of said positions, parallel to each other, a plurality of feet for supporting said base support including at least a pair of rear feet, at least one forward foot and at least one upper rear foot whereby said support may be supported by said rear feet and forward foot in one position, and said rear feet and upper rear foot in another position.

4. A stereoscopic apparatus adapted for viewing stereoscopic aerial photographs and for locating control points and plotting maps therefrom and adapted for use on a drawing table, comprising, a stereoscopic binocular eye-piece, having a pair of viewing elements, a base support adapted for mounting on said drawing table, and means connecting said eye-piece and support for positioning said eye-piece over said table in laterally spaced relation to said support to leave the underlying table free from said support for the receipt of said photographs and last named means including an arm having a plurality of pivots parallel to each other one of said pivots being mounted to rotate adjacent to the forward end of said base support and the other of said pivots being connected to said eye-piece, said means being operable to adjust the vertical and horizontal position of said eye-piece over said table while maintaining the viewing axes of said eye-piece substantially perpendicular to said table and in maintaining the planes of said viewing axes in all of said positions, parallel to each other, a plurality of feet for supporting said base support including at least a pair of rear feet, at least one forward foot and at least one upper rear foot whereby said support may be supported by said rear feet and forward foot in one position, and said rear feet and upper rear foot in another position, and means for adjusting the pupillary spacing of said viewing elements and providing a transverse rectilinear adjustment of said viewing elements relative to each other.

5. A stereoscopic apparatus adapted for viewing stereoscopic aerial photographs and for locating control points and plotting maps therefrom and adapted for use on a drawing table, comprising, a stereoscopic binocular eye-piece, having a pair of viewing elements, a base support adapted for mounting on said drawing table, and means connecting said eye-piece and support for positioning said eye-piece over said table in laterally spaced relation to said support to leave the underlying table free from said support for the receipt of said photographs said last named means including an arm having a plurality of pivots parallel to each other one of said pivots being mounted to rotate adjacent to the forward end of said base support and the other of said pivots being connected to said eye-piece, said means being operable to adjust the vertical and horizontal position of said eye-piece over said table while maintaining the viewing axes of said eye-piece substantially perpendicular to said table and in maintaining the planes of said viewing axes in all of said positions, parallel to each other, a plurality of feet for supporting said base support including at least a pair of rear feet, at least one forward foot and at least one upper rear foot whereby said support may be supported by said rear feet and forward foot in one position, and said rear feet and upper rear foot in another position, and means on the eye-piece including a shaft and an opening therefore for supporting the elements for adjusting the pupillary spacing of said elements.

6. A stereoscopic apparatus adapted for viewing stereograms, and designed for use on a table; comprising a stereoscopic eye-piece with a pair of viewing axes, a supporting base; means connecting said eye-piece and base for positioning said eye-piece over said table in laterally spaced relation to said base so as to leave the underlying table unimpeded by said base for the positioning of stereograms for viewing, and including an arm having a substantially horizontal pivotal connection adjacent each end to said base and eye-piece; base supporting means comprising spaced rocking portions defining a line substantially parallel to the transverse optic axes of the eye-piece; and means arranged for co-operation with said rocking portions to support said base in different tilted positions comprising portions on the base fore and aft of said rocking portions one higher than the other.

7. A stereoscopic apparatus adapted for viewing stereoscopic photographs and for locating control points and plotting maps therefrom and designed for use on a table, comprising: a stereoscopic binocular eye-piece having a pair of prismatic lenses mounted with their viewing axes in a common plane, means for adjusting the pupillary spacing of said lenses while maintaining said axes in said plane, a base adapted for mounting on said table; means connecting said eye-piece and base for positioning said eye-piece over said table in laterally spaced relation to said base so as to leave the underlying table unimpeded by said base for the positioning of the photographs for viewing, and including an arm, means pivotally connecting the opposite ends of said arm along parallel pivotal axes to the forward end of said base and to the stereoscopic eye-piece to permit rotation thereof relative to said arm; said means being operable to adjust the vertical and horizontal position of said eye-piece over said table while maintaining the viewing axes of said eye-piece substantially perpendicular to said table; and manually operable means for locking said connecting means with said base and said eye-piece in any of their adjusted positions; said base having spaced tilting supporting portions at opposite sides of a vertical plane between said optic axes and perpendicular optic axes, and supporting portions, one higher than the other and substantially in said vertical plane forwardly and rearwardly of said first portions and arranged so that one or the other in combination with said first portion may support the base in different tilted positions of said base.

8. A stereoscopic apparatus adapted for viewing stereoscopic aerial photographs and for locating control points and plotting maps therefrom and adapted for use on a drawing table or the like comprising, a stereoscopic binocular eye-piece fitted with prismatic lenses adjustable to change the pupillary spacing of said lenses while maintaining the axes of said lenses in a common plane, a supporting base for said apparatus adapted for mounting on said table, an arm, pivotal means connecting the opposite ends of said arm to said base and said eye-piece for relative rotation of said base and eye-piece and arm ends about parallel axes parallel to a line intersecting said lens centers whereby said eye-piece may be positioned over said table in various laterally and vertically spaced positions relative to said base leaving the underlying table surface free for receipt of said photographs and while maintaining said optic axes plane perpendicular to said table, said base being provided with spaced table engaging portions formed to rock on the table, a rest on said base forwardly of said portions for retaining the base in said operative position of said eye-piece, and a rest on said base rearwardly and elevated from said portions in the operative position of said base and adapted to engage said table to limit the rearward rocking movement of said base and retain said base in a rearwardly rocked position.

9. A stereoscopic apparatus adapted for viewing stereoscopic aerial photographs and for locating control points and plotting maps therefrom and adapted for use on a drawing table or the like comprising, a stereoscopic binocular eye-piece fitted with prismatic lenses adjustable to change the pupillary spacing of said lenses while maintaining the axes of said lenses in a common plane, a supporting base for said apparatus adapted for mounting on said table, an arm, pivot means connecting the opposite ends of said arm to said base and said eye-piece for relative rotation of said base and eye-piece and arm ends about parallel axes parallel to a line intersecting the lens centers whereby said eye-piece may be positioned over said table in various laterally and vertically spaced positions relative to and forwardly of said base leaving the underlying table surface free for receipt of said photographs while maintaining said optic axes plane perpendicular to said table, said base being provided with four feet for supporting the apparatus in various positions of tilt, two of said feet being affixed to the lower rear edge of said base along a line substantially parallel to said first line and adapted to be in constant contact with said table, a third of said feet being positioned in front of said pair and at substantially the same elevation on said base, and a fourth of said feet being positioned behind and above said pair, the combination of feet as defined providing a three-point support in two different planes and a rocking of said base on said pair of feet from one of said planes to the other whereby during rocking of the base between said planes said eye-piece is confined to a path of movement wherein said first line moves to successive parallel positions.

HARRISON C. RYKER.